July 28, 1931. J. I. HULL 1,816,777
FREQUENCY CHANGER
Filed Oct. 3, 1928
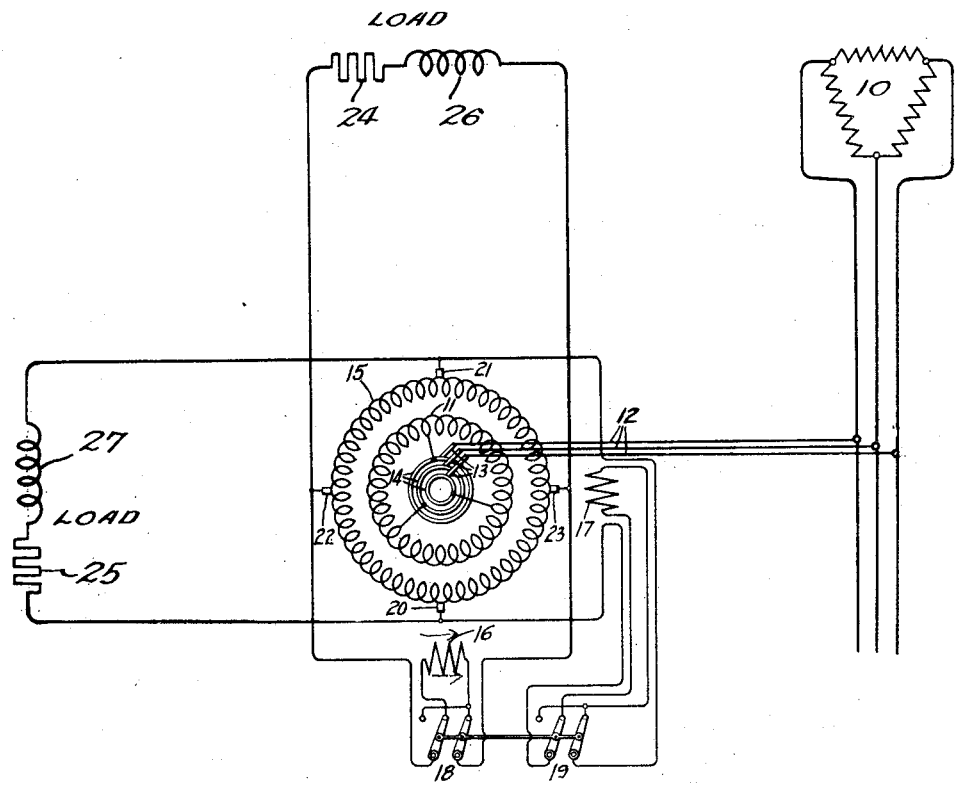
Inventor:
John I. Hull,
by Charles E. Tulla
His Attorney.

Patented July 28, 1931

1,816,777

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

FREQUENCY CHANGER

Application filed October 3, 1928. Serial No. 310,021.

My invention relates to commutator type frequency changers and their method of operation. The invention is particularly beneficial in self propelled frequency changers supplying low power factor apparatus. In industry there exists a rather large number of types of machinery which can be most advantageously operated at frequencies substantially below the usual commercial frequencies of 25 and 60 cycles; such for example are induction motors that sometimes need to be operated at very low speeds for threading in operation in paper mills and other places and vibrating devices which are sometimes employed to operate sand sifters, ore sifters, and the like. Some of these devices, especially the vibrating types, operate at very low power factor due to the highly inductive character of the apparatus.

In accordance with my invention important economies relative to the design and operation of the frequency changer supplying such installations are made available by operating the frequency changer above synchronous speed and utilizing the lagging current of the inductive load to supply the exciting current of the frequency changer and reduce commutation difficulties and may even cause the frequency changer to serve the purpose of a synchronous condenser to improve the power factor of the system from which the frequency changer is supplied.

In carrying my invention into effect in one form I provide a frequency changer comprising a primary wound rotor which is connected to an alternating current supply system, a separate commutated winding on the rotor from which the transformed frequency is taken, two sets of adjustable brushes bearing on the commutator and stationary secondary windings on the stator connected to the commutator by means of adjustable brushes for operation above synchronous speed in a manner to utilize lagging load current supplied by the frequency changer as pointed out hereinafter.

The features of my invention which are believed to be new and patentable will be pointed out in the claims appended hereto. For a better understanding of my invention reference should be had to the accompanying drawing which represents a preferred arrangement of the apparatus and connections therefor.

Referring to the drawing I have represented an alternating current polyphase supply system 10 electrically connected to the primary winding 11 by means of leads 12, brushes 13 and slip rings 14. The secondary windings 16 and 17 are located on the stator and are connected to the commutated winding 15 through the double throw switches 18 and 19.

The commutated winding 15 is located on the rotor and forms a separate circuit from the primary winding and to simplify the drawing the commutator connected to winding 15 is not shown on the drawing. The windings of the secondary are connected to the commutator by means of adjustable brushes 20 and 21, 22 and 23 which are represented as resting directly on winding 15. I have represented the load as being a two-phase inductive load connected across the same brushes as the stator windings with 24 and 25 representing the resistance components of the loads and 26 and 27 representing the inductive reactance components of the loads.

Considering more particularly the conditions when power is supplied to the primary 11 by the alternating current commercial supply system 10, it will be apparent to those familiar with the art that there will be induced in the stator windings an electromotive force. The machine may be caused to operate above or below synchronous speed by moving the switches 18 and 19 to the right or left so as to reverse the relative voltage polarities between the voltage induced in each secondary winding and the voltage injected by the winding 15 into each secondary winding.

When this relationship is so selected as to cause the machine to operate below synchronous speed the phase sequence of the currents taken from the commutator brushes is opposite to the mechanical rotation of the machine, but if the machine is caused to operate above synchronous speed the phase sequence is the same as the mechanical rotation. The desired low frequency currents can be obtained by operating the frequency changer with the same slip above and below synchronous speed, but it is customary to operate below synchronous speed to reduce the mechanical strains on the frequency changer. When the machine is operating below synchronous speed considering adjacent coils, the current in the commutated winding is flowing in an opposite direction to the current flowing in the stator windings. Thus there is an opposing relation between the ampere turns of the commutated winding 15 and the secondary or stator windings 16 and 17 and also whatever reactive component of current is required by 26 and 27 acts against the magnetizing force needed to set up the working flux of the frequency changer in its passage through the commutated winding 15. But if the secondary windings 16 and 17 are reversed with respect to their circuits through the commutated winding 15 the machine will operate at appropximately the same slip above synchronous speed. As illustrated in the drawing, the double throw switches 18 and 19 are provided for reversing the secondary windings 16 and 17 with respect to their circuits through the commutated windings 15 and it is assumed that with the switches 18 and 19 closed in the position shown the frequency changer is operating above synchronous speed. Thus when the machine is caused to operate above synchronous speed the ampere turns set up by current flowing in the commutated winding 15 and the secondary windings 16 and 17 are additive and also the effect of the lagging wattless current component required by the load in its passage through the winding 15 will assist in the magnetization of the machine. It will thus be seen that the lagging wattless current itself of the load may be used to assist in magnetizing the machine thus reducing the magnetizing current supplied by the source 10 and therefore the greatest possible economy in the use of copper and reduction in the losses of the machine may be secured by operating it above synchronous speed instead of below.

If 26 and 27 are highly inductive so that the reactive current of the load supplies more magnetizing force than needed as the machine is operated above its synchronous speed then by manipulating the brush position slightly in the direction of rotation, some of this reactive load current can be transferred into the stator windings 16 and 17 instead of the rotor winding 15 and when flowing in the stator windings it will have a demagnetizing effect on the machine. This will give a decrease in the size of the commutator needed. It might also in some cases be economical to allow some magnetizing current to flow in the winding 11 from the source of supply in which case a lagging current will be drawn from the supply system. If it is desired to relieve the power supply system of all magnetizing current for the frequency changer or even to supply magnetizing current from the frequency changer to the supply system the brush position could be so manipulated that if any additional magnetizing effect over and above that produced by the lagging load current flowing in the winding 15 is required to produce either of these results, this additional magnetizing flux can be produced by circulating magnetizing current through secondary winding 16 and its corresponding circuit through winding 15 between the brushes 20, 21 and similar relation between the secondary winding 17 and its corresponding circuit through the commutated winding 15 between the brushes 22, 23. Thus demagnetizing current for the frequency changer would be taken from the supply system. In other words, under these conditions the frequency changer would be helping to magnetize the supply system or furnishing what is commonly described as leading current, just as a synchronous condenser does when over-excited.

When the frequency changer is supplying current to a capacity load then 26 and 27 will represent the capacity reactance components of the load and it is desirable to operate the frequency changer below synchronous speed because the leading currents taken by 26 and 27 in passing through the winding 15 assist in magnetizing the machine, thus making it possible to most economically supply the load with a leading current component. The frequency changer is caused to operate below synchronous speed by moving the switches 18 and 19 to the left. The flux produced by the currents flowing in windings 16 and 17 will oppose the flux produced by the currents flowing in winding 15 and therefore operation below synchronous speed with capacity loads is not quite as favorable as operation above synchronous speed with inductive loads.

An additional advantage in operating the frequency changer above synchronous speed for reactive loads resides in a simplified means for improving commutation. It is known when the machine is at standstill and voltage is applied to the primary of the machine no voltage of rotation will be generated in the coils of the commutated winding short-circuited by the brushes, but there will be induced a voltage in the coils due to transformer effect. When the machine is allowed to rotate the transformed voltage in the coils undergoing commutation will be decreased due to the decrease in the difference between the speed of the flux of the winding 11 and the speed of the coils undergoing commutation, but when the machine is rotated there will also be a voltage of rotation generated in the coils undergoing commutation. The two voltages will be additive because the phase sequence of the currents taken from the commutator brushes is opposite to the mechanical rotation and the magnitude of the two voltages will be the same as the induced voltage before the machine starts to rotate. It is obvious that if the usual interpole windings are provided on the frequency changer, these interpole windings could neutralize the rotation voltage but could not neutralize the transformer voltage because the transformer voltage lags 90 electrical degrees behind the rotation voltage and therefore the transformer voltage tends to produce sparking at the commutator brushes. As the machine is caused to rotate at synchronous speed there will be no transformed voltage in the coils undergoing commutation, but as the speed of the machine is increased above synchronism a transformed electromotive force is induced in the coils undergoing commutation, but its direction will be opposite to what it was when the machine was operating below synchronism, because the phase sequence of the currents taken from the commutator brushes is in the same direction as the mechanical rotation and the transformer voltage will oppose the rotation voltage generated in the same coils. Thus the transformed voltage in the coils undergoing commutation when the machine is operating above synchronous speed will tend to neutralize the rotation voltage in the same coils. Thus when the frequency changer is operated above synchronous speed and it is desired to prevent a transformer voltage being induced in the coils undergoing commutation it is not necessary to destroy in the commutating zones all of the magnetizing force required by the working flux of the machine, but only to reduce it in magnitude. This result can be attained by increasing the air gap in the commutating zone in a well known manner, for example as illustrated in the Lamme U. S. Patent 682,943. It will be apparent that the air gap can be increased so the rotation voltage generated in the coils undergoing commutation will neutralize the transformed voltage induced in the same coils undergoing commutation. In my copending patent application Serial No. 408,585 I have illustrated and explained the use of interpoles to reduce sparking by producing at each commutation zone a flux of sufficient strength to destroy the working flux at the zones and leave a reversed flux at the zones to induce in the coils undergoing commutation a voltage equal and opposite to the transformer voltage. Accordingly it will be seen where the frequency changer is operated above synchronous speed that if the air gap is maintained uniform in the commutating zones and interpoles are used to assist commutation the strength of the interpole coils need not be sufficient to destroy in the commutating zones all the magnetizing force required by the working flux of the machine, but only to reduce it in magnitude so the rotation voltage generated in the coils undergoing commutation will be of sufficient magnitude to neutralize the transformed induced voltage in the same coils. It is obvious that the elimination of the transformer voltage makes it possible to obtain sparkless commutation by employing the usual type of interpole windings. If the secondary windings 16 and 17 are omitted and the frequency changer is rotated by external means, the frequency changer should be operated below synchronous speed when supplying leading currents and above synchronous speed when supplying lagging currents, so that the reactive components of the load currents in each case will assist in magnetizing the machine and thus induce the magnetizing current supplied by the source 10.

It may be noted from the diagram that I have represented the load as being of two phases but it will be evident to those familiar with the subject that the principles involved are equally applicable to other numbers of phases.

In accordance with the provisions of the patent statues I have described the principle of operation of my invention, together with the apparatus which I now consider to represent the best embodiment thereof, for carrying my invention into effect, but I desire to have it understood that the apparatus shown and described is only illustrative and that the invention may be carried out by other means.

What I claim as new and desire to secure by Letters Patent of the United States, is:

1. In combination, a source of alternating current, apparatus to be operated by an alternating current having a frequency different from that of said source and a commutator type frequency changer connected between said source and said apparatus, the said frequency changer comprising relatively rotatable members, one of said members having a primary winding energized by said source and a commutated winding supplying the alternating current to said apparatus through commutator brushes, secondary windings on the other of said members, and switching means between the secondary windings and the commutator brushes for reversing the relative voltage polarities between the voltage induced in each secondary winding and the voltage injected by the commutated winding into each secondary winding.

2. In combination, a source of alternating current, apparatus to be operated by an alternating current having a frequency different from that of said source and a commutator type frequency changer connected between said source and said apparatus, the said frequency changer comprising a rotating primary winding energized by said source, a rotating commutated winding supplying the alternating current to said apparatus through commutator brushes, stationary secondary windings, each of said secondary windings being connected to a pair of said commutator brushes, and a switch interposed between each secondary winding and its corresponding pair of said brushes to interchange the ends of each secondary winding connected to said corresponding pair of brushes.

3. In combination, an alternating current supply system, apparatus to be operated by a lagging alternating current having a frequency different from that of the supply system and a commutator type frequency changer connected between said supply system and said apparatus, the said frequency changer comprising a rotating primary winding connected to said supply system by collector rings and brushes, a rotating commutated winding connected to said apparatus by brushes and leads for supplying the said lagging alternating current to said apparatus, a stator member having secondary windings, and connecting means between the brushes of said commutated winding and said secondary windings to cause the said frequency changer to operate above its synchronous speed whereby the lagging currents flowing in the said commutated winding will help to magnetize the said frequency changer.

In witness whereof, I have hereunto set my hand this 2nd day of October, 1928.

JOHN I. HULL.